United States Patent [19]

Yapp et al.

[11] 4,069,889

[45] Jan. 24, 1978

[54] STEERING SYSTEMS

[75] Inventors: Robert Ernest Yapp, Solihull; Derek John Smith, Sutton Coldfield, both of England

[73] Assignee: Massey-Ferguson Services N.V., Curacao, Netherlands

[21] Appl. No.: 745,513

[22] Filed: Nov. 26, 1976

[30] Foreign Application Priority Data

Dec. 4, 1975    United Kingdom ............... 49758/75

[51] Int. Cl.$^2$ ............................................. B62D 5/08
[52] U.S. Cl. .................................... 180/132; 60/453; 91/418
[58] Field of Search ............... 180/132, 133, 134, 135, 180/136, 137, 139, 147, 148, 161, 163; 60/386, 453, 378, 399; 417/435; 91/418

[56] References Cited

U.S. PATENT DOCUMENTS

| Re. 25,036 | 9/1961 | Donner .............................. 180/133 |
| 2,918,135 | 12/1959 | Wittren .............................. 180/133 |
| 3,820,620 | 6/1974 | Miller et al. ..................... 180/133 |

FOREIGN PATENT DOCUMENTS 1,324,319   7/1973   United Kingdom ................. 180/139

*Primary Examiner*—Philip Goodman
*Assistant Examiner*—John A. Pekar
*Attorney, Agent, or Firm*—Thomas P. Lewandowski

[57] ABSTRACT

A power steering system has a valve between the pump and steering unit. The valve maintains a constant pressure differential so that the pump is unable to deliver aerated fluid to the unit in the event of loss of fluid or fracture of a pipe.

3 Claims, 1 Drawing Figure

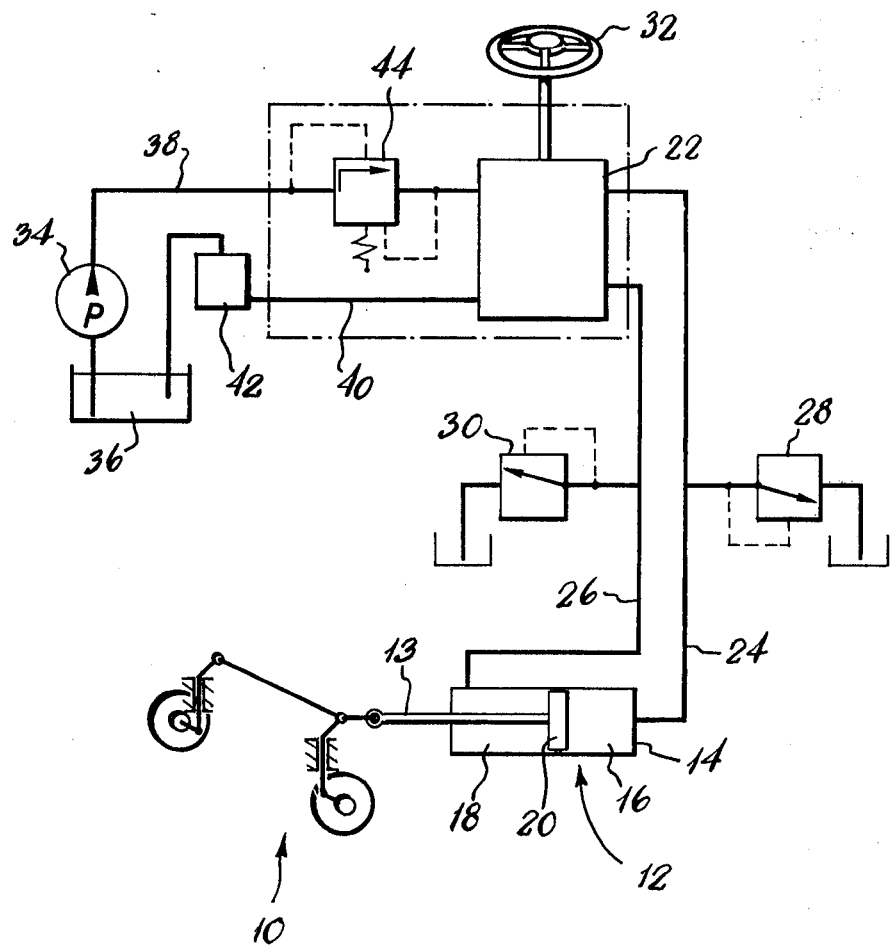

STEERING SYSTEMS

This invention relates to steering systems for vehicles.

On vehicles equipped with hydrostatic steering systems the operator of the vehicle must be protected against the loss of steering caused by fracture of hydraulic pipes or failure of the pump supplying the pressurised fluid for the system. To this end legislation has been passed which requires such steering systems to include a separate reservoir having a specified volume related to the difference in swept volume of the chambers of the power cylinder and a check valve in the line between the pump and the steering unit to prevent loss of fluid from the unit. Whilst such a system operates satisfactorily in the event of total pump failure it has been found that a complete loss of steering may occur in the event of a partial fracture of the supply line. The reason for this appears to be that the pump is still capable of delivering an aerated fluid at a pressure sufficient to overcome the check valve so that air is introduced into the system resulting in a loss of steering.

It is an object of the present invention to provide a system in which the above disadvantages are obviated or mitigated.

According to the present invention there is provided a steering system comprising a source of pressurised fluid a steering control unit connected to said source by means of a hydraulic conduit and controlling flow to hydraulic motor means to cause movement thereof in one of two directions, said hydraulic conduit having valve means for creating a pressure differential in flow from said source to said steering unit but preventing flow in the opposite direction, said pressure differential being greater than the pressure generated by said source when using an aerated mixture of fluid.

An embodiment of the invention will now be described by way of example only with reference to the accompanying drawing in which the FIGURE is a diagrammatic representation of a steering system.

Referring to the drawings, the dirigible wheels 10 of a vehicle are steered by the position rod 13 of a hydraulic motor 12 comprising a cylinder 14 divided into two chambers 16, 18 by a piston 20. The chambers 16, 18 are provided with fluid from a steering unit 22 by conduits 24, 26 respectively. Each of the conduits 24, 26 include a relief valve 28, 30 respectively to protect the conduits against excess pressure loads.

The steering unit 22 may be of any convenient form to direct fluid to one or other of the conduits 24, 26 depending on the direction of rotation of a steering wheel 32.

A pump 34 delivers fluid from a sump 36 to the steering unit by way of a supply conduit 38. Fluid is returned from the steering unit through a return line 40. A reservoir 42 is supplied in the return line 40 and has a volume greater than the difference in the swept volumes of the chambers 16 and 18, the outlet from the reservoir 42 being higher than the inlet so that the reservoir 42 is full at all times in normal operation.

A valve 44 is provided in the supply line 38 to create a predetermined pressure differential between the pump 34 and the inlet to the steering unit 22 and to prevent reverse flow from the steering unit 22 to the pump 34. The valve 44 is conveniently formed integrally with the steering unit 22, as indicated by chain dotted lines.

In normal operation, the pump 34 delivers pressurised fluid to the conduit 38, through the valve 44 to the steering unit 22 where it is directed to the appropriate chamber 16, 18 or back to the sump 36.

In the event of failure of the pump 34 or complete breakage of the pipe 38 the steering unit 22 is designed to operate as a manually operated pump to operate the steering motor 12. The valve 44 prevents expulsion of fluid from the steering unit 22 and the reservoir 42 supplies sufficient fluid to keep the steering unit 22 full of fluid, this being necessary because of the difference in the swept volumes of the chambers 16 and 18. Thus the steering system operates satisfactorily in the event of pump failure. However, should the pipe 38 partially split or a union become loose it has been found that the pump 34 can deliver aerated fluid at relatively high pressure. In conventional systems in which the valve 44 is a normal check valve, the aerated fluid is delivered to the steering unit so that a compressible fluid is introduced into the system resulting in complete loss of steering action. Further, should fluid leak from the system, due to, for example, a faulty pump seal or a loose pipe joint in the return line, the pump may suck aerated fluid and deliver it to the supply line 38. Again, if the valve 44 is merely a check valve, aerated fluid may be delivered to the steering unit 22 resulting in complete loss of steering.

To overcome the above problems, the valve 44 is a differential pressure regulator which prevents flow to the steering unit 22 unless a predetermined pressure is achieved. In practice the pressure differential is chosen to be greater than that which the pump 34 is able to deliver when using aerated fluid. In a typical application the pump 34 was found to be capable of delivering 30 to 40 p.s.i. when using aerated fluid so the valve 44 was chosen to operate at a pressure differential of 100 p.s.i. Thus the pump 34 is unable to generate sufficient pressure to deliver aerated fluid into the steering unit 22 when it is under emergency manual control. Obviously different systems will require different parameters for the valve 44 but these are readily determined.

What we claim is:

1. A steering system comprising a source of pressurised fluid, a steering control unit connected to said source by means of a hydraulic conduit and controlling flow to hydraulic motor means to cause movement thereof in one of two directions, said hydraulic conduit having valve means for sensing a pressure differential in said hydraulic conduit and preventing flow from said source to said steering unit below a predetermined pressure level and preventing flow in the opposite direction, said predetermined pressure level being greater than the pressure generated by said source when using an aerated mixture of fluid.

2. A steering system according to claim 1 wherein said predetermined pressure level is greater than 100 pounds per square inch.

3. A steering system according to claim 1 wherein said valve means is housed within said steering unit.

* * * * *